United States Patent [19]

Carey et al.

[11] 4,069,203

[45] Jan. 17, 1978

[54] RAPID CURING POLYEPOXIDE COMPOSITIONS

[75] Inventors: James E. Carey, Mantua; Lawrence C. Reilly, Cherry Hill, both of N.J.

[73] Assignee: Shell Oil Company, Houston, Tex.

[21] Appl. No.: 623,522

[22] Filed: Oct. 17, 1975

[51] Int. Cl.$^2$ .............................................. C08G 59/58
[52] U.S. Cl. ........................... 260/47 EC; 260/18 EP; 260/47 EA; 260/78.41
[58] Field of Search ........ 260/18 EP, 47 EC, 47 EN, 260/47 EA, 2 EC, 2 N, 78.4 EP, 2 EA

[56] References Cited

U.S. PATENT DOCUMENTS

| 3,324,198 | 6/1967 | Gruver | 260/836 |
|---|---|---|---|
| 3,329,652 | 7/1967 | Christie | 260/47 |
| 3,438,937 | 4/1969 | Christie | 260/47 |
| 3,489,695 | 1/1970 | Green | 260/2 |
| 3,507,831 | 4/1970 | Avis et al. | 260/47 |
| 3,635,894 | 1/1972 | Dowbenko et al. | 260/47 |

FOREIGN PATENT DOCUMENTS 588,799  12/1959  Canada.

OTHER PUBLICATIONS

Lee et al., "Handbook of Epoxy Resins," pp. 11-21 and 11-22, McGraw-Hill, 1967.
Potter, "Epoxide Resins," pp. 81-83, Butterworth & Co., London, 1970.
Wiesner, "Hardening Agent for Epoxy Resins," Chemical Abstracts 80, 4364W (1-14-74).

*Primary Examiner*—Harold D. Anderson
*Assistant Examiner*—E. A. Nielsen
*Attorney, Agent, or Firm*—Norris E. Faringer

[57] ABSTRACT

Rapid curing polyepoxide compositions comprise (1) a polyepoxide, (2) a liquid organic dibasic acid and (3) an imidazole compound.

7 Claims, No Drawings

RAPID CURING POLYEPOXIDE COMPOSITIONS

BACKGROUND OF THE INVENTION

Imidazole compounds have been utilized both as curing agents for epoxy resins and as catalysts for the anhydride curing of epoxy resins. See, for example, U.S. Pat. Nos 3,438,937 and 3,329,652.

It has now been found that when epoxy compounds are cured with a special organic dibasic acid in the presence of an imidazole compound, the resulting cured resins exhibit a flexible clear, heterophase composition with unexpectedly good impact resistance and high elongation after yield.

SUMMARY OF THE INVENTION

The present invention is directed to an improved rapid curing epoxy composition comprising (1) a polyepoxide possessing at least one vicinal epoxy group, (2) a liquid organic dibasic acid and (3) an imidazole compound.

DESCRIPTION OF THE PREFERRED EMBODIMENT

Epoxy Compounds

The epoxy compounds which may be used are those possessing at least one 1,2-epoxide group, i.e., a

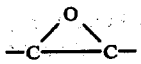

group. They may be monoepoxides or polyepoxides. The monoepoxides may be aliphatic or cycloaliphatic or heterocyclic and may be saturated or unsaturated. They may also be substituted with aromatic rings, ether groups, halogen atoms, ester groups, and the like. Examples of the monoepoxides include, among others, styrene oxide, phenyl glycidyl ether, allyl glycidyl ether, octadecyl glycidyl ether, amyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, diacrylate of the monoglycidyl ether of glycerol, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, glycidyl oleate, methyl 1,2-epoxypropionate, butyl 1,2-epoxypropionate, and the like.

The polyepoxides used in the process of the invention comprise those compounds possessing at least one and preferably more than one 1,2-epoxide group. These polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are those preferably having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other suitable mono and polyepoxides, including ethers and esters are disclosed in U.S. Pat. No. 3,738,862, and so much of the disclosure of that patent relevant to examples of epoxy compounds is incorporated by reference into this specification.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° to 150° C. The heating is continued for several hours to effect the reaction and the product is then washed free of salt and base.

The preparation of suitable glycidyl polyethers of polyhydric phenols as well as examples of other suitable epoxy compounds are described in U.S. Pat. No. 3,219,602, and so much of that disclosure relevant to epoxy resins is incorporated herein by reference.

Organic Polybasic Acid

The organic polybasic acids which may be used in the present compositions include the dibasic acids prepared by the Diels Alder adduction of a long chain polyunsaturated fatty acid such as a $C_{21}$ acid with an alpha-beta-ethylenically unsaturated acid such as acrylic acid, methacrylic acid, crotonic acid, etc.

Suitable dicarboxylic acids are commercially available and have the general formula

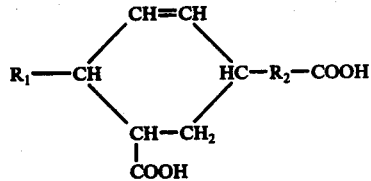

wherein $R_1$ is an alkyl group of up to about 10 carbon atoms and $R_2$ is an alkylene group of up to 12 carbon atoms.

A particularly useful acid is a liquid $C_{21}$ organic acid having the following type structure:

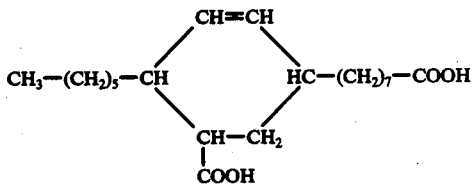

Imidazole Compounds

Suitable imidazole compounds include the imidazoles and benzimidazoles as well as substituted imidazoles and substituted benzimidazoles and their salts.

Examples of heterocyclic compounds possessing in the heterocyclic ring (1) a substituted C=N—C group and (2) a secondary amino group, i.e., an =N—H group, including the imidazoles, such as the substituted imidazoles and benzimidazoles having the structural formulae:

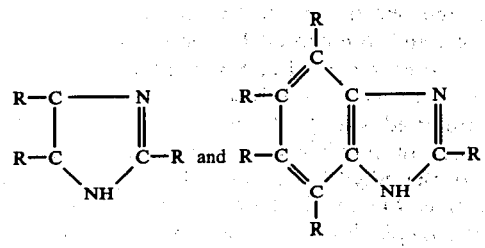

respectively, wherein R is selected from hydrogen atoms, halogen atoms, or an organic radical, such as hydrocarbon radical or a substituted hydrocarbon radical, for example, the ester, ether, amide, imide, amino, halogen, or mercapto substituted hydrocarbon radicals. The acid portion of the salt is selected from an acid, such as phosphoric, acetic, lactic, formic, propionic and the like. Especially preferred imidazoles are those wherein the substituent is hydrogen or a hydrocarbon radical and preferably an alkyl, alkenyl, cycloalkyl, cycloalkenyl, aryl, alkaryl or arylalkyl radicals, and particularly those containing no more than 15 carbon atoms.

Particularly preferred acid salts include the salts of monocarboxylic acids having from about 1 to 8 carbon atoms, lactic acid, phosphoric acid, and polycarboxylic acids such as tartaric, oxalic and the like.

A more detailed description of the chemistry of the imidazoles and benzimidazoles including their properties and structural formulas is found in the book by Klaus Hofmann entitled "Imidazole and Its Derivatives" published by Interscience Publishers, Inc., New York, (1953). Examples of imidazole salts include, among others, the acetate, formate, lactate, and phosphate salts of imidazole, benzimidazole and substituted imidazoles. Examples of suitable substituted imidazoles include: 2-methylimidazole; 2-ethyl-4-methylimidazole; 2-cyclohexyl-4-methylimidazoles; 4-butyl-5-ethylimidazole; 2-butoxy-4-allylimidazole; 2-carboethoxybutyl-4-methyl-imidazole; 2-octyl-4-hexylimidazole; 2-methyl-5-ethylimidazole; 2-ethyl-4-(2-ethylamino)imidazole; 2-methyl-4-mercaptoethylimidazole; 2,5-chloro-4-ethylimidazole; and mixtures thereof. Especially preferred are the alkyl-substituted imidazole acetates, lactates tartrates wherein the alkyl groups contain not more than 8 carbon atoms each, or mixtures thereof, and particularly preferred are 2-ethyl-4-methylimidazole acetate, 2-ethyl-4-methylimidazole lactate, 2-methylimidazole acetate, 2-methylimidazole lactate, imidazole acetate; imidazole lactate and mixtures thereof.

Other suitable imidazole compounds and salts are adequately described in U.S. Pat. No. 3,329,652, 3,356,645, 3,394,105, 3,418,333, 3,438,937, 3,507,831 and 3,562,213, and so much of their disclosures relevant to imidazole and benzimidazole compounds and salts is hereby incorporated by reference.

In general, the diacid, polyepoxide and imidazole compound are simply reacted together at a temperature of from about 65° to 125° C and allowed to cure to a tough polymeric product. If desired, the imidazole compound may be added to the diacid, which composition remains clear and stable across a wide temperature range. This pre-catalyzed diacid composition may be subsequently added to the polyepoxide and the composition cured.

Preferably, at least 1.75 parts by weight (pbw) of the imidazole compound is used per 100 parts by weight of the polybasic organic acid (diacid). More preferably, from about 3 to 20 pbw of imidazole compound is used per 100 pbw of the diacid.

It has been found that useful, improved polymers are obtained when employing the diacid/imidazole compound at levels of from about 20 to 80 pbw per 100 pbw of the polyepoxide. Less than about 20 pbw of the diacid/imidazole compound results in soft, chessy polymers and more than about 85 pbw per 100 pbw of polyepoxide results in polymers with low strength.

Accordingly, the following compositions produce clear, heterophase compositions exhibiting unexpectedly good impact resistance and high elongation after yield and are therefore preferred:

1. 100 parts by weight of polyepoxide
2. 30–70 parts by weight of a catalyzed composition comprising:
   a. 100 parts by weight of an organic dibasic acid, and
   b. 2 to 10 parts by weight of an imidazole compound.

It may be desirable under certain circumstances to employ a co-catalyst such as the organic phosphines, e.g., triphenyl phosphine; the phosphonium halides; stannous salts of monocarboxylic acids, e.g., stannous octoate; amines; acid anhydrides and the like.

Additional materials may also be added for certain applications, including, but not limited to pigments, dyes, stabilizers, plasticizers, fillers, bodying agents, and the like.

To illustrate the instant compositions, the following examples are given. It is to be understood that the examples are for the purpose of illustration only and the invention is not to be regarded as limited to any specific compounds or conditions recited therein. Unless otherwise specified, parts disclosed in the Examples are part by weight.

EXAMPLE I

This example illustrates the preparation of seven compositions wherein the ratio of diacid to epoxy resin is varied from 20 to 80 pbw of diacid to 100 pbw of polyepoxide (EPON Resin 838 — a diglycidyl polyether of Bisphenol A having an average molecular weight of about 380 and an average equivalent weight of about 180).

Three parts by weight of imidazole were added to 100 parts by weight of DIACID 1550 (a $C_{21}$ dibasic acid prepared by the Diels Alder adduction of a $C_{18}$ polyunsaturated acid with acrylic acid). Then various amounts of this catalyzed diacid were added to EPON Resin 828 and the composition cured at 100° for 2 hours. The result of seven experiments is tabulated in Table I.

It will be appreciated from the data in Table I that the best balance of impact resistance and strength results when about 60 pbw of a diacid/imidazole (100:3 pbw) composition is used per 100 parts by weight of polyepoxide. Microscopic examination of the resulting clear polymers shows spherical inclusions typicals of heterophase systems.

TABLE I
EPON® Resin 828/Diacid Imidazole Castings

|  | 1 | 2 | 3 | 4 |
|---|---|---|---|---|
| EPON Resin 828 | 100 | 100 | 100 | 100 |
| 100 pbw Diacid | 20 | 30 | 40 | 50 |
| 3.0 pbw Imidazole | | | | |
| Barcol Hardness | 24 | 16 | 10 | 5 |
| Shore D Hardness | 85 | 87 | 84 | 84 |
| HDT, °C | 83 | 85 | 71 | 62 |
| R.T. Impact (Unnotched) in-lb | 2.53 | 1.69 | 2.02 | 3.22 |
| Water Boil 24 Hrs. % Gain | 1.78 | 1.67 | 2.08 | 2.55 |
| Condition After | Clear | Clear | Clear | Clear |
| R.T. Tensile Properties (Crosshead Speed 0.05"/Min.) psi | | | | |
| Mod. | 320,000 | 370,000 | 390,000 | 360,000 |
| Yld. | — | — | — | — |
| Max. | 10,800 | 9,100 | 9,140 | 9,050 |
| Ult. | 10,800 | 9,100 | 9,140 | 9,050 |
| % Elong | | | | |
| Yld. | — | — | — | — |
| Max. | 6.89 | 3.89 | 3.78 | 4.13 |
| Ult. | 6.89 | 3.89 | 3.78 | 4.13 |
| Toughness (Relative Area Under Stress/Strain Curve) | 37,200 | 17,700 | 17,300 | 18,700 |

|  | 5 | 6 | 7 |
|---|---|---|---|
| EPON Resin 828 | 100 | 100 | 100 |
| 100 pbw Diacid | 60 | 70 | 80 |
| 3.0 pbw Imidazole | | | |
| Barcol Hardness | 2 | 0 | 0 |
| Shore D Hardness | 83 | 82 | 77 |
| HDT, °C | 55 | 48 | 39 |
| R.T. Impact (Unnotched) in-lb | 5.84 | 6.32 | 3.71 |
| Water Boil 24 Hrs. % Gain | 2.91 | 3.20 | 3.33 |
| Condition After | Sl. Cloudy | Cloudy | Cloudy |
| R.T. Tensile Properties (Crosshead Speed 0.05"/Min.) psi | | | |
| Mod. | 390,000 | 350,000 | 240,000 |
| Yld. | 8,750 | 7,450 | — |
| Max. | 8,750 | 7,450 | 5,050 |
| Ult. | 6,000 | 4,800 | 5,050 |
| % Elong | | | |
| Yld. | 3.56 | 3.56 | — |
| Max. | 3.56 | 3.56 | 3.56 |
| Ult. | 19.1 | 12.1 | 3.56 |
| Toughness (Relative Area Under Stress/Strain Curve) | 130,256 | 52,300 | 8,000 |

Example II

This example illustrates the preparation of molding compositions utilizing various ratios of epoxy resin to a mixture of DIACID 1550 and imidazole (100:6 pbw). The results are tabulated in Table II.

EXAMPLE III

This example illustrates the preparation of casting compounds utilizing various ratios of epoxy resin to a mixture of DIACID 1550 and imidazole (100:1.5 pbw). The results are tabulated in Table III.

EXAMPLE IV

If the procedures of Examples I to III were repeated wherein the imidazole was replaced with an equivalent amount of imidazole acetate, imidazole tartrate, imidazole adipate, 2-methyl imidazole, or imidazole lactate, similar improved results are expected.

TABLE II
EPON®Resin 828/Diacid Imidazole Castings

|  | 1 | 2 | 3 | 4 |
|---|---|---|---|---|
| EPON Resin 828 | 100 | 100 | 100 | 100 |
| 100 pbw Diacid | | | | |
| 6.0 pbw Imidazole | 20 | 30 | 40 | 50 |
| Barcol Hardness | 24 | 21 | 16 | 5 |
| Shore D hardness | 87 | 85 | 83 | 83 |
| HDT, °C | 96.5 | 79.5 | 68 | 54 |
| R.T. Impact (Unnotched) in-lb | 0.92 | 1.65 | 3.49 | 2.88 |
| Water Boil 24 Hrs. % Gain | 1.71 | 2.58 | 3.26 | 4.50 |
| Condition After | Clear | Clear | Clear | Cloudy |
| R.T. Tensile Properties (Crosshead Speed 0.05"/Min.) psi | | | | |
| Max. | 7,320 | 7,870 | 8,470 | 5,530 |
| Ult. | 7,320 | 7,870 | 8,470 | 5,530 |

TABLE II-continued

EPON®Resin 828/Diacid Imidazole Castings

| | | | | |
|---|---|---|---|---|
| % Elong | | | | |
| Max. | 2.91 | 3.0 | 3.41 | 1.69 |
| Ult. | 2.91 | 3.0 | 3.41 | 1.69 |

| | 5 | 6 | 7 |
|---|---|---|---|
| EPON Resin 828 | 100 | 100 | 100 |
| 100 pbw Diacid } 6.0 pbw Imidazole } | 60 | 70 | 80 |
| Barcol Hardness | 9 | 3 | 0 |
| Shore D Hardness | 85 | 83 | Brittle |
| HDT, °C | 50.0 | 49.5 | |
| R.T. Impact (Unnotched) in-lb | 2.88 | 7.71 | |
| Water Boil 24 Hrs. % Gain | 4.31 | 4.60 | |
| Condition After | Sl. Cloudy | Cloudy | |
| R.T. Tensile Properties (Crosshead Speed 0.50"/Min.) psi | | | |
| Max. | 8,300 | 6,150 | |
| Ult. | 8,300 | 6,150 | |
| % Elong | | | |
| Max. | 2.86 | 2.10 | |
| Ult. | 2.86 | 2.10 | |

TABLE III

EPON® Resin 828/Diacid-Imidazole Castings

| | 1 | 2 | 3 | 4 |
|---|---|---|---|---|
| EPON Resin 828 | 100 | 100 | 100 | 100 |
| 100 pbw Diacid } 1.5 pbw Imidazole } | 20 | 30 | 40 | 50 |
| Barcol Hardness | 0 | 10 | 12 | 5 |
| Shore D Hardness | 72 | 85 | 86 | 84 |
| HDT, °C | <20 | 63 | 65 | 59 |
| R.T. Impact (Unnotched) in-lb | 0.89 | 5.0 | 6.0 | 5.2 |
| Water Boil 24 Hrs. % Gain | 6.02 | 2.55 | 1.90 | 2.12 |
| Condition After | Clear | Clear | Clear | Clear |
| R.T. Tesnile Properties (Crosshead Speed 0.05"/Min.) psi | | | | |
| Yld. | 1,940 | 10,600 | 9,300 | 9,230 |
| Max. | 2,680 | 10,600 | 9,300 | 9,230 |
| Ult. | 2,680 | 8,630 | 7,830 | 7,200 |
| % Elong | | | | |
| Yld. | 5.6 | 4.4 | 4.5 | 3.9 |
| Max. | 74 | 4.4 | 4.5 | 3.3 |
| Ult. | 74 | 7.9 | 10.0 | 5.8 |

We claim as our invention:

1. A rapid heat-curable composition comprising (1) 100 parts by weight of a polyepoxide having more than 1,2-epoxide group, and (2) from 30 to 70 parts by weight of a composition comprising (a) 100 parts by weight of a liquid organic dicarboxylic acid of the general formula:

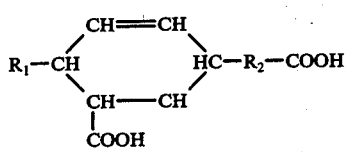

wherein
$R_1$ is an alkyl group of up of about 10 carbon atoms and $R_2$ is an alkylene group of up to 12 carbon atoms,
and (b) about at least 1.75 parts by weight of an imidazole compound of the general formula:

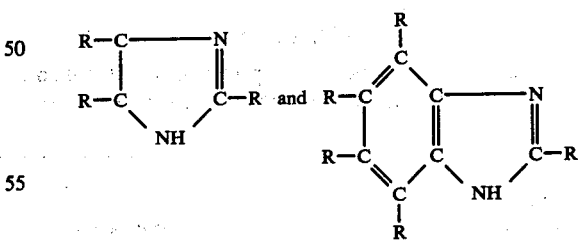

wherein
R is selected from the group consisting of hydrogen atoms, halogen atoms and hydrocarbon radicals containing no more than 15 carbon atoms.

2. A composition of claim 1 wherein the polyepoxide is a glycidyl polyester of 2,2-bis(4-hydroxyphenyl)propane.

3. A composition as in claim 1 wherein the organic dicarboxylic acid is a $C_{21}$ organic acid of the general structure:

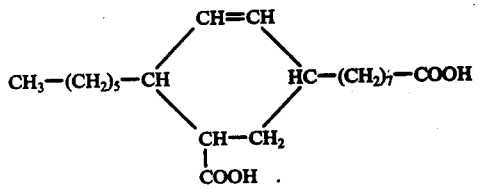

4. A composition as in claim 1 wherein the imidazole compound is imidazole.

5. A composition as in claim 1 comprising (1) 100 parts by weight of the polyepoxide and (2) from 30 to 70 parts by weight of a catalyzed composition comprising (a) 100 parts by weight of the liquid organic dicarboxylic acid and (b) from 2 to 10 parts by weight of the imidazole compound.

6. A composition as in claim 5 wherein from 40 to 60 parts by weight of the catalyzed composition is employed.

7. A composition as in claim 5 wherein from 2 to 10 parts by weight of imidazole compound is employed.

* * * * *